(12) United States Patent
Braunberger

(10) Patent No.: US 9,395,699 B2
(45) Date of Patent: **\*Jul. 19, 2016**

(54) TIMING SYSTEM AND DEVICE AND METHOD FOR MAKING THE SAME

(71) Applicant: Vision Works IP Corporation, Sequim, WA (US)

(72) Inventor: Alfred S. Braunberger, Sequim, WA (US)

(73) Assignee: Vision Works IP Corporation, Sequim, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/884,680

(22) Filed: Oct. 15, 2015

(65) Prior Publication Data

US 2016/0033938 A1 Feb. 4, 2016

Related U.S. Application Data

(63) Continuation of application No. 13/665,546, filed on Oct. 31, 2012, now Pat. No. 9,188,962.

(60) Provisional application No. 61/554,456, filed on Nov. 1, 2011.

(51) Int. Cl.
*G04F 13/04* (2006.01)
*G01K 11/12* (2006.01)

(52) U.S. Cl.
CPC .............. *G04F 13/04* (2013.01); *G01K 11/12* (2013.01)

(58) Field of Classification Search
CPC ........... G04F 1/00; G04F 1/066; G04F 13/04; G01K 3/04; G01K 11/12; G01N 31/229

USPC .......................................... 368/113, 114, 327
See application file for complete search history.

(56) References Cited

U.S. PATENT DOCUMENTS

| | | | |
|---|---|---|---|
| 2,651,755 A | 9/1953 | Triplett | |
| 3,119,754 A | 1/1964 | Blumenfeld et al. | |
| 3,210,662 A | 10/1965 | Steinmetz et al. | |
| 3,336,212 A | 8/1967 | Nicholas et al. | |
| 3,512,049 A | 5/1970 | Hoberman et al. | |
| 3,543,582 A | 12/1970 | Sessler | |
| 3,564,347 A | 2/1971 | Peck | |
| 3,613,002 A | 10/1971 | Trenkler et al. | |
| 3,638,120 A | 1/1972 | Jost | |

(Continued)

FOREIGN PATENT DOCUMENTS

| | | |
|---|---|---|
| WO | 01/82006 A1 | 11/2001 |
| WO | 03/052524 A1 | 6/2003 |

(Continued)

*Primary Examiner* — Amy Cohen Johnson
*Assistant Examiner* — Matthew Powell
(74) *Attorney, Agent, or Firm* — Haverstock & Owens LLP

(57) ABSTRACT

A timing device that includes an anode layer, a cathode layer and an electrolyte attached to a base layer. The anode layer and the cathode layer are placed adjacent to one another along an axis of the timing device. Upon activation of the timing device the anode layer is depleted away from the cathode layer until the timing device is fully expired. Once the timing device is expired, a change is seen indicating that the timing device has expired. In some embodiments, a color change indicates that the timing device has expired. In some embodiments, as the timing device expires electronically readable information is uncovered.

21 Claims, 4 Drawing Sheets

(56) References Cited

U.S. PATENT DOCUMENTS

| | | | |
|---|---|---|---|
| 3,768,015 A | 10/1973 | Moser | |
| 3,942,467 A | 3/1976 | Witonsky | |
| 3,967,579 A | 7/1976 | Seiter | |
| 3,974,495 A | 8/1976 | Jones | |
| 3,977,900 A | 8/1976 | Luehrs | |
| 3,999,946 A | 12/1976 | Patel | |
| 4,084,511 A | 4/1978 | Svrjcek, Jr. | |
| 4,100,490 A | 7/1978 | Peck et al. | |
| 4,153,345 A | 5/1979 | Duchene et al. | |
| 4,212,153 A | 7/1980 | Kydonieus et al. | |
| 4,277,974 A | 7/1981 | Karr et al. | |
| 4,308,486 A | 12/1981 | Gange | |
| 4,314,874 A | 2/1982 | Abe et al. | |
| 4,327,117 A | 4/1982 | Lenack et al. | |
| 4,392,236 A | 7/1983 | Sandstrom et al. | |
| 4,408,557 A | 10/1983 | Bradley | |
| 4,431,313 A | 2/1984 | Hemperly | |
| 4,488,780 A | 12/1984 | Nicholson | |
| 4,505,595 A | 3/1985 | Rose et al. | |
| 4,527,522 A | 7/1985 | Cerny | |
| 4,629,330 A | 12/1986 | Nichols | |
| 4,646,066 A | 2/1987 | Baughman | |
| 4,797,864 A | 1/1989 | Stano et al. | |
| 4,804,275 A | 2/1989 | Kang et al. | |
| 4,844,622 A | 7/1989 | Weiss | |
| 4,860,269 A | 8/1989 | Hennings et al. | |
| 4,929,090 A | 5/1990 | Grahm | |
| 5,034,233 A | 7/1991 | McCoy, Jr. | |
| 5,045,283 A | 9/1991 | Patel | |
| 5,053,339 A | 10/1991 | Patel | |
| 5,085,802 A | 2/1992 | Jalinski | |
| 5,182,212 A | 1/1993 | Jalinsky | |
| 5,254,473 A | 10/1993 | Patel | |
| 5,339,024 A | 8/1994 | Kuo et al. | |
| 5,368,905 A | 11/1994 | Ohno | |
| 5,418,086 A | 5/1995 | Bailey | |
| 5,420,000 A | 5/1995 | Patel et al. | |
| 5,446,705 A | 8/1995 | Haas | |
| 5,544,925 A | 8/1996 | Ikeda | |
| 5,555,223 A | 9/1996 | Barainsky | |
| 5,602,804 A | 2/1997 | Haas | |
| 5,633,835 A | 5/1997 | Haas et al. | |
| 5,667,303 A | 9/1997 | Arens et al. | |
| 5,672,465 A | 9/1997 | Patel et al. | |
| 5,699,326 A | 12/1997 | Haas et al. | |
| 5,709,472 A | 1/1998 | Prusik et al. | |
| 5,719,828 A | 2/1998 | Haas et al. | |
| 5,756,356 A | 5/1998 | Yangyai et al. | |
| 5,785,354 A | 7/1998 | Haas | |
| 5,797,344 A | 8/1998 | Ramsey et al. | |
| 5,802,015 A | 9/1998 | Rothschild et al. | |
| 5,822,280 A | 10/1998 | Haas | |
| 5,830,683 A | 11/1998 | Hendricks et al. | |
| 5,912,759 A | 6/1999 | Good et al. | |
| 5,930,023 A | 7/1999 | Mitchell, Jr. et al. | |
| 5,930,206 A | 7/1999 | Haas et al. | |
| 5,947,369 A | 9/1999 | Frommer et al. | |
| 5,959,295 A | 9/1999 | Braun | |
| 5,989,852 A | 11/1999 | Hendricks et al. | |
| 5,997,927 A | 12/1999 | Glics | |
| 6,042,264 A | 3/2000 | Prusik et al. | |
| 6,103,351 A | 8/2000 | Ram et al. | |
| 6,113,857 A | 9/2000 | Manico et al. | |
| 6,198,701 B1 | 3/2001 | De Jonghe et al. | |
| 6,243,192 B1 | 6/2001 | Mitchell, Jr. et al. | |
| 6,244,208 B1 | 6/2001 | Qui et al. | |
| 6,269,764 B1 | 8/2001 | Adamy et al. | |
| 6,285,492 B1 | 9/2001 | Good et al. | |
| 6,295,252 B1 | 9/2001 | Hold et al. | |
| 6,331,076 B1 | 12/2001 | Coll | |
| 6,373,786 B1 | 4/2002 | Kagan et al. | |
| 6,426,503 B1 | 7/2002 | Wuest | |
| 6,435,128 B2 | 8/2002 | Qui et al. | |
| 6,452,873 B1 | 9/2002 | Holt et al. | |
| 6,544,925 B1 | 4/2003 | Prusik et al. | |
| 6,750,458 B1 | 6/2004 | Rourk | |
| 6,801,477 B2 | 10/2004 | Braunberger | |
| 6,822,931 B2 | 11/2004 | Braunberger | |
| 6,826,119 B2 | 11/2004 | Fortune | |
| 7,079,452 B2 | 7/2006 | Harrison | |
| 7,215,976 B2 | 5/2007 | Brideglall | |
| 7,254,095 B1 | 8/2007 | Braunberger | |
| 7,294,379 B2 | 11/2007 | Ko et al. | |
| 7,362,663 B2 | 4/2008 | Kagan | |
| 7,372,780 B1 * | 5/2008 | Braunberger | H01M 10/486 116/206 |
| 7,463,558 B2 | 12/2008 | Braunberger | |
| 7,476,874 B2 | 1/2009 | Patel | |
| 7,489,596 B2 | 2/2009 | Kuczynski | |
| 7,589,331 B2 | 9/2009 | Havens | |
| 7,813,226 B2 | 10/2010 | Braunberger | |
| 8,014,234 B2 | 9/2011 | Braunberger | |
| 8,018,347 B2 | 9/2011 | Tehrani et al. | |
| 8,077,553 B2 | 12/2011 | Braunberger | |
| 8,503,269 B2 | 8/2013 | Braunberger | |
| 8,559,278 B2 | 10/2013 | Braunberger | |
| 2003/0053377 A1 * | 3/2003 | Spevacek | G01K 3/04 368/327 |
| 2003/0104353 A1 | 6/2003 | Brielmeier et al. | |
| 2003/0104848 A1 * | 6/2003 | Brideglall | G06K 7/0008 455/574 |
| 2003/0112711 A1 | 6/2003 | Braunberger | |
| 2003/0151985 A1 | 8/2003 | Braunberger | |
| 2003/0152483 A1 | 8/2003 | Munagavalasa | |
| 2004/0092023 A1 | 5/2004 | Wright | |
| 2004/0232052 A1 | 11/2004 | Call et al. | |
| 2005/0248455 A1 * | 11/2005 | Pope | G01K 1/024 340/539.27 |
| 2005/0276165 A1 | 12/2005 | Chien | |
| 2006/0145091 A1 | 7/2006 | Patel et al. | |
| 2006/0145863 A1 * | 7/2006 | Martin | B65D 79/02 340/572.8 |
| 2006/0227669 A1 | 10/2006 | Pennaz et al. | |
| 2007/0064541 A1 | 3/2007 | Kagan | |
| 2007/0089433 A1 * | 4/2007 | McDonnell | A23L 3/00 62/115 |
| 2007/0268785 A1 | 11/2007 | Braunberger | |
| 2008/0023362 A1 * | 1/2008 | Genosar | B65D 33/2591 206/459.1 |
| 2008/0043804 A1 * | 2/2008 | Goldsmith | G01K 3/04 374/106 |
| 2008/0210152 A1 | 9/2008 | Robinson et al. | |
| 2009/0010304 A1 | 1/2009 | Skinner et al. | |
| 2009/0016176 A1 * | 1/2009 | Braunberger | G04F 13/04 368/327 |
| 2009/0266291 A1 | 10/2009 | Braunberger | |
| 2009/0303041 A1 * | 12/2009 | Tehrani | G01K 3/04 340/540 |
| 2010/0149929 A1 * | 6/2010 | Braunberger | G04F 13/04 368/223 |
| 2010/0219351 A1 | 9/2010 | Roberts et al. | |
| 2010/0251955 A1 | 10/2010 | Knoll | |
| 2010/0275835 A1 * | 11/2010 | Su | G01N 31/229 116/206 |
| 2011/0017123 A1 * | 1/2011 | Maschietti | G01K 3/04 116/216 |
| 2011/0037541 A1 | 2/2011 | Johnson et al. | |
| 2011/0084128 A1 * | 4/2011 | Haarer | G01K 3/04 235/375 |
| 2011/0286314 A1 | 11/2011 | Braunberger | |
| 2012/0256727 A1 | 10/2012 | Moore, Jr. | |
| 2013/0107676 A1 | 5/2013 | Braunberger | |

FOREIGN PATENT DOCUMENTS

| | | |
|---|---|---|
| WO | 2004/077172 A2 | 9/2004 |
| WO | 2009/038806 A1 | 3/2009 |
| WO | 2010/099340 A2 | 2/2010 |
| WO | 2011/098830 A1 | 8/2011 |

* cited by examiner

TIMING SYSTEM AND DEVICE AND METHOD FOR MAKING THE SAME

RELATED APPLICATION

This patent application is a continuation of the co-pending U.S. patent application Ser. No. 13/665,546, filed Oct. 31, 2012 and entitled "TIMING SYSTEM AND DEVICE AND METHOD FOR MAKING THE SAME." This Patent Application also claims priority under 35 U.S.C. 119(e) of the co-pending U.S. provisional patent application, Application No. 61/554,456, filed on Nov. 1, 2011, and entitled "TIMING SYSTEM AND DEVICE AND METHOD FOR MAKING THE SAME". The U.S. Provisional Patent Application, Ser. 61/554,456, filed Nov. 1, 2011, and entitled "TIMING SYSTEM AND DEVICE AND METHOD FOR MAKING THE SAME," and the co-pending U.S. patent application Ser. No. 13/665,546, filed Oct. 31, 2012 and entitled "TIMING SYSTEM AND DEVICE AND METHOD FOR MAKING THE SAME" are both hereby incorporated by reference.

FIELD OF THE INVENTION

The present invention relates to timing systems, temperature indicators and visual indicators and devices and methods for making the same. More specifically, the invention relates to systems and devices for methods of indicating and/or recording; the passage of a duration of time, that a preset temperature has been exceeded or of indicating the accumulation of other sensory data.

BACKGROUND OF THE INVENTION

Galvanic cells, or Voltaic cells derive electrical energy from chemical reactions taking place within the cell. They generally consist of two different metals and an electrolyte. When the dissimilar metals come in contact with a common electrolyte, a potential difference is created between the metals. Once an electron path is provided, external to the cell itself, electrons flow from the anode to the cathode. Electrons flow from the anode to the cathode, depleting atoms of electrons, causing the remaining atoms to become ions.

These cells are more generally referred to within the public domain as batteries and are more predominantly used as a means of storing electrical energy.

However, some applications of these cells, like certain timing systems, temperature indicators and visual indicators, capitalize on other attributes inherent to these cells. One particular attribute of interest is the transformation of molecules within the anode from atom to ion and the subsequent change in optical properties. The optical properties of the anode change from opaque to transparent as atoms become ions.

The change in optical properties is relied upon within certain timing systems, temperature indicators and visual indicators, also referred to as time dependent color changing labels. Within these applications anode material consists of a thin metal film which has been deposited by evaporation or sputter or similar technique and configured on the same plane or nearly the same plane as a cathode such that when an electrolyte is introduced, anode atoms begin to deplete themselves of electrons and transform into ions, beginning at a point closest to the cathode. As depletion continues an ion rich transparent region begins to expand in a direction away from the cathode.

As the optical properties of the anode change from opaque to transparent backgrounds that used to lay hidden become visible. The expansion of the transparent region reveals various colors, text and/or patterns which have been printed just behind the anode. Progression of the transparent region indicates that increasing intervals of time have expired based on the appearance of colors text and/or patterns. This describes the general operation of some expiration indicators or color changing labels.

SUMMARY OF THE INVENTION

The present application is directed to a timing device that includes an anode layer, a cathode layer and an electrolyte attached to a base layer. The anode layer and the cathode layer are placed adjacent to one another along an axis of the timing device. Upon activation of the timing device the anode layer is depleted away from the cathode layer until the timing device is fully expired. Once the timing device is expired, a change is seen indicating that the timing device has expired. In some embodiments, a color change indicates that the timing device has expired.

In one aspect a timing device comprises a first timing component and a second timing component, wherein the first timing component and the second timing component are independently activated. In some embodiments, each of the first timing component and the second timing are an electrochemical timing device and comprise an anode layer, a cathode layer, a base layer, an electrolyte attached to the base layer, and a means for activating the timing device. In some embodiments, the anode layer comprises Al and the cathode layer comprises Cu. In further embodiments, the first timing component is temperature independent. In some embodiments, the second timing component is sensitive to temperature. In further embodiments, the second timing component is not activated until a certain temperature is reached. In some embodiments, a visual change is seen when a certain temperature is reached. In further embodiments, a visual change is seen as the timing device expires. In still further embodiments, the timing device reveals a two-dimensional barcode and is electronically readable. In some embodiments, the timing device is coupled to an additional object.

In another aspect, a timing system comprises a plurality of timing devices and each timing device comprises a first timing component and a second timing component, wherein each timing device is configured to measure a different, discrete period of time. In some embodiments, each timing device is depleted after activation in order to show a passage of time. In further embodiments, a visual change is seen as one of the plurality of timing devices is depleted. In some embodiments, the plurality of timing devices arranged in a sequential pattern. In some embodiments, each timing device remains dormant until a previous timing device is expired. In further embodiments, each timing device is configured to measure a thirty-day time period. In some embodiments, the first timing component and the second timing component are independently activated. In some embodiments, the second timing component is activated when a certain temperature is reached. In some of these embodiments, the second timing component is configured to indicate exposure to a temperature in five minute intervals. In some embodiments, the timing system is coupled to an additional object.

In a further aspect, a timing device comprises an anode layer, a cathode layer, a base layer, an electrolyte attached to the base layer, and an activator to activate the timing device, wherein upon activation the anode layer depletes in a direction away from the cathode layer and an electronically readable information is revealed. In some embodiments, the electronically readable information comprises a two-dimensional barcode. In some embodiments, the electronically readable information comprises a RFID antenna.

DETAILED DESCRIPTION OF THE INVENTION

The description below concerns several embodiments of the presently claimed invention. The discussion references the illustrated preferred embodiment. However, the scope of the presently claimed invention is not limited to either the illustrated embodiment, nor is it limited to those discussed, to the contrary, the scope should be interpreted as broadly as possible based on the language of the Claims section of this document.

This disclosure provides several embodiments of the presently claimed invention. It is contemplated that any features from any embodiment can be combined with any features from any other embodiment. In this fashion, hybrid configurations of the illustrated embodiments are well within the scope of the presently claimed invention.

Figure 1:
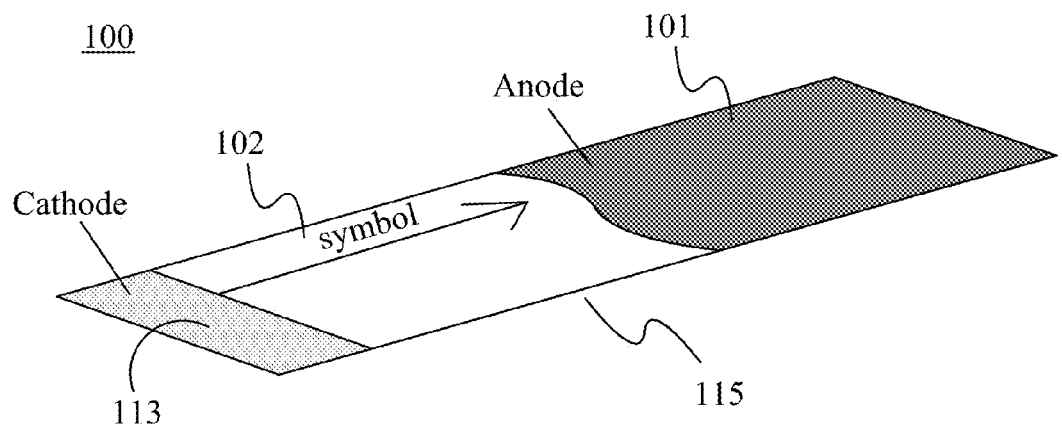
FIG. 1 illustrates an electro-chemical timing device in accordance with some embodiments.

Referring now to FIG. 1, a timing device is depicted therein. The timing device 100 comprises an anode 101 and a cathode 113 which have been deposited on a substrate 115, and a quantity of electrolyte (not shown). In some embodiments, the anode 101 and the cathode 113 are thin-film deposited onto the substrate 115. However, the anode 101 and the cathode 113 are able to be attached to the substrate 115 by any appropriate method as known in the art. Upon activation of the timing device 100, the anode 101 is depleted longitudinally away from and perpendicular to the cathode 113, as demonstrated by the arrow. Depletion of the anode 101 occurs at a point nearest to the cathode 113 first and progresses longitudinally away from and perpendicular to the cathode 113. Depletion of the anode 101 occurs at an initial rate which lessens as the anode 101 depletes away from the cathode 113. In some embodiments, the timing device comprises multiple anode depletion patterns 102 printed or deposited onto the substrate 115 that are uncovered as the depletion of the anode 101 progresses. In some embodiments, as the anode 101 is depleted, a top layer becomes transparent. In some embodiments, the anode depletion patterns 102 comprise electronically readable information which is uncovered as the depletion of the anode 101 progresses. In some embodiments, the depletion of the anode 101 is sensitive to temperature. In some embodiment, the anode 101 comprises aluminum (Al) and the cathode 113 comprises copper (Cu).

The timing device 100 comprises a means to activate the device. In some embodiments, the timing device 100 comprises a protective reservoir which contains a small amount of electrolyte (not shown) molded to the cathode layer and protruding outward. The timing device is activated when a consumer applies pressure to the protrusion thereby braking the barrier and depositing the small quantity of electrolyte into contact with the main body of the timing device and activating the timing device.

In some embodiments, as the timing device expires a visual change is seen. For example, in some embodiments a color change or change in transparency is seen as the anode layer of the timing device is depleted. Alternatively or in addition, as the anode layer is depleted text, a logo, or a pattern in uncovered. In further embodiments, as the anode layer is depleted electronically readable information is uncovered. For example, in some embodiments, as the anode layer is depleted a barcode and/or a two-dimensional barcode is uncovered. As time progresses, the anode material of the timing device is depleted and more electronically readable information is uncovered. In some embodiments, the timing device is sensitive to temperature.

Generally, the rate of reaction of an electro-chemical reaction within a timing device increases with an increase in temperature. Particularly, timing devices that utilize liquid electrolytes experience an increase in conductivity of the electrolyte with an increase in temperature. This is due to the overall mobility of the molecules within the liquid electrolyte. Consequently, when designing a timing device that utilizes a depleting anode layer to indicate a passage of time, the effect of the changing conductivity of the electrolyte must be considered. Without some way to correct for the change in temperature, the timing device is only accurate within a controlled temperature environment. However, by compensating for the change in temperature a timing device is able to be used for applications in a non-controlled temperature environment.

The electrochemical timing devices rely upon an electron flow through a path that is external to the timing cell. Consequently, influencing the flow of the electrons also influences the depletion rate of the anode material because the depletion occurs when the atoms in the anode material gives up electrons. These electrons flow through the return path.

Connecting a temperature dependent resistor (TDR) in series with the electron return path affects the rate of flow of the electrons. If the TDR has a negative temperature coefficient then its conductivity decreases with an increase in temperature. This is opposite to what occurs within the electrolyte. Consequently, if the TDR's rate of change in the negative direction is equal to the electrolyte's rate of change in the positive direction, then the timing device is temperature corrected or temperature independent for each instantaneous moment in time. In this manner, the timing device is able to be corrected for an ambient temperature change. However, a change of the internal resistance of the electrolyte across a broad spectrum of time must be considered in order to ensure that the entire timing device is accurate independent of temperature.

As time progresses the anode material depletes in a direction further away from the cathode. As the anode depletes, the electrolyte migrates along with the depletion of the anode, increasing the distance between the cathode and the anode. As the distance between the cathode and the anode increases so does the internal resistance of the electrolyte. Since the rate of electron flow or current (I) is dependent upon factors which include total resistance ($R_T$) (the sum of the internal resistance ($R_I$) and the external resistance ($R_X$)), the electron flow must be decreasing at a constant rate as the anode depletes. This poses a problem when using a TDR by itself to affect the electron flow or current and correct for temperature. TDR's are an effective means of correcting for ambient temperature when current fluctuations due to changing temperature are the only variable. In order for TDRs to work across a broad spectrum of time, the changes in current, due to an increase in $R_I$ must be made constant, thus eliminating it as a variable.

Figure 2:
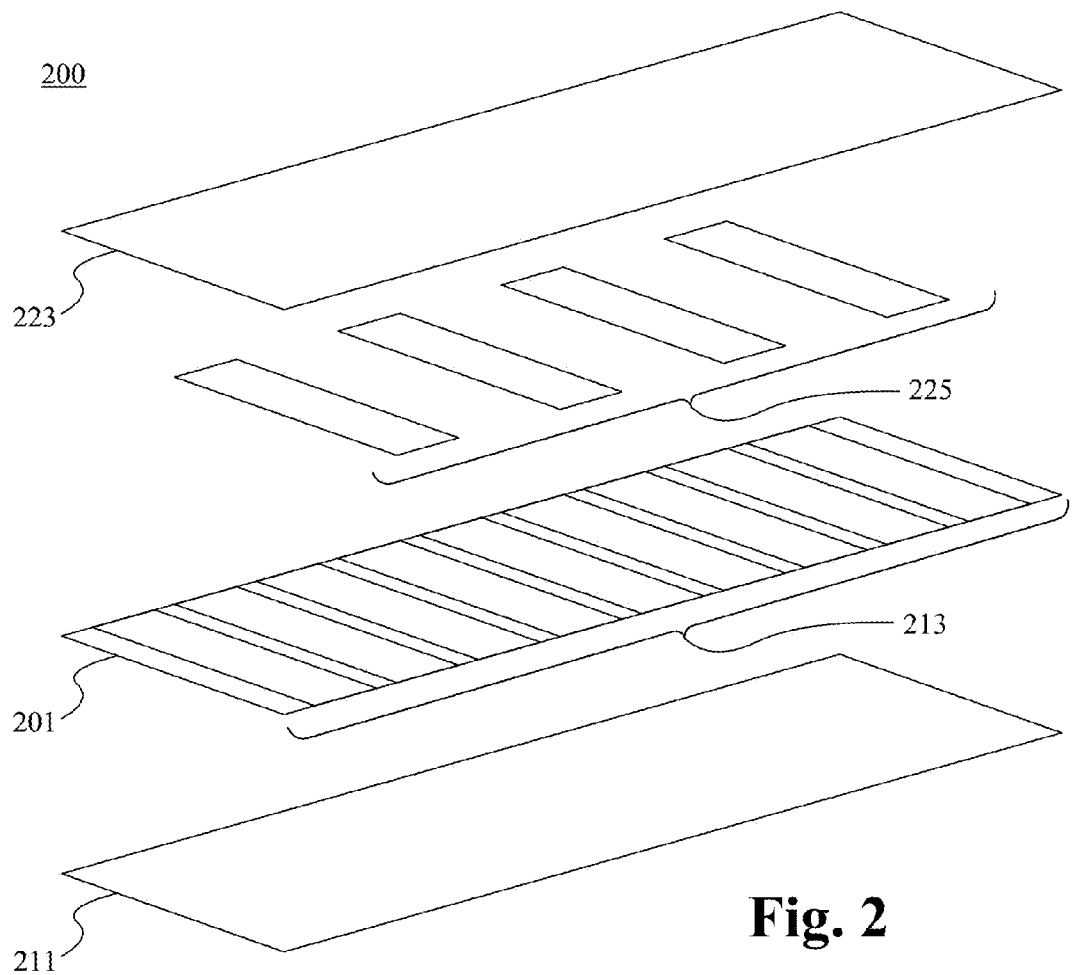
FIG. 2 illustrates an electro-chemical timing device in accordance with some embodiments.

One solution is to design a timing device so that an anode only has to deplete a very short distance before a new cathode structure is revealed and limit the range of distance-related-current changes that need to be considered. FIG. 2 shows an exploded view of a timing device with a plurality of cathode trace structures introduced in a close proximity throughout the timing device. As shown in FIG. 2, the timing device 200 comprises a base 221, an anode layer 201, an electrolyte (not shown), a plurality of cathode trace structures 213, a plurality of masks 225 and a cover 223. In some embodiments, when the timing device 200 is activated the anode layer 201 is depleted at a point nearest the first cathode trace structure at the beginning of the timing device 200 and progresses in a direction longitudinally away from and perpendicular to the first cathode trace structure to the second cathode trace structure. In this manner, the anode layer is depleted along the length of the timing device. As the number of cell divisions and cathode trace structures increases, so does the resolution and the accuracy of the timing device.

Figure 3:
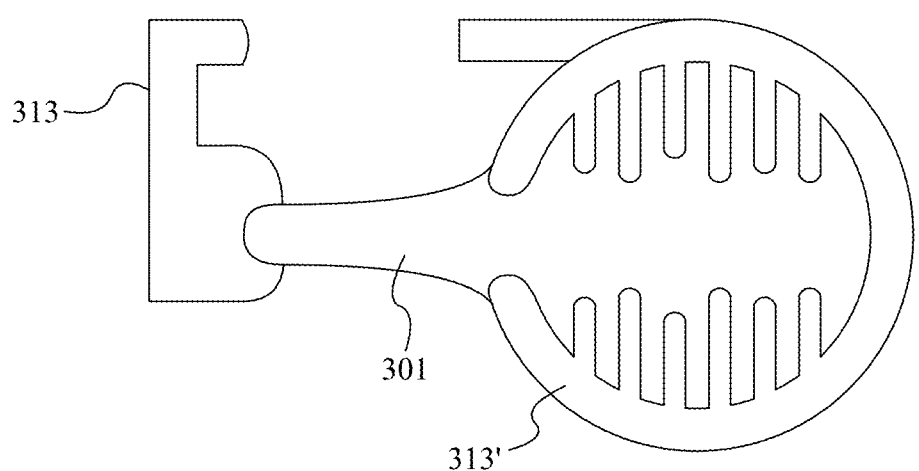
FIG. 3 illustrates an electro-chemical timing device in accordance with some embodiments.

In further embodiments, a method of generating a constant current includes varying the plate size of the anode. Particularly, because the total resistance throughout the timing device is relatively low, the current densities (A/cm$^2$) as related to the cathode and anode plates are near maximum. Thus, reducing the initial size of the anode plate nearest the cathode artificially reduces available current. Gradually increasing its size, results in increasingly higher current levels over time and anode depletion distance. Consequently, the anode is formed in a particular shape which becomes wider as the anode depletion increases in distance from the cathode. This shape becomes wider with distance at the same rate as the resistance increases with distance. FIG. 3 shows a timing device with an anode layer that becomes wider as the anode layer increases in distance from the cathode. As shown in FIG. 3, the timing device 300 comprises an anode layer 301 and a plurality of cathode trace structures 313 and 313'. In some embodiments, when the timing device 300 is activated the anode layer 301 is depleted at a point nearest the first cathode trace structure at the beginning of the timing device 300 and progresses in a direction longitudinally away from and perpendicular to the first cathode trace structure to the second cathode trace structure. As the anode becomes wider, the distance to the cathode becomes greater and the internal "electrolyte" resistance becomes greater. Since the increased anode size (increasing current) occurs with a corresponding increase in resistance (decreasing current) the current through timing device remains flat or constant and the timing device is able to adequately compensate for fluctuations in temperature.

Figure 4:
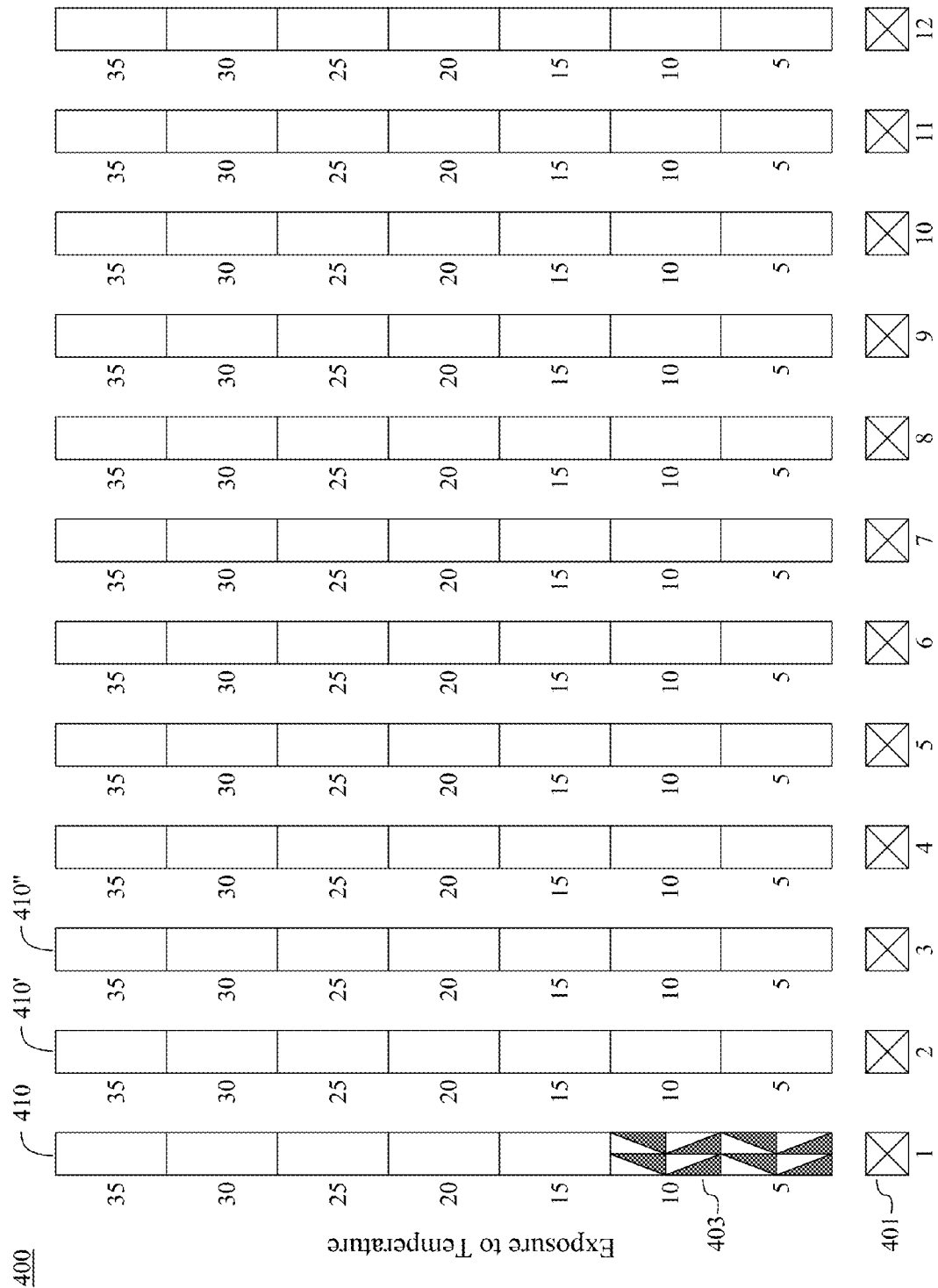
FIG. 4 illustrates an electro-chemical timing device and system in accordance with some embodiments.

In some embodiments, a timing device is configured to measure an exposure to temperature as a separate time period. Referring now to FIG. 4, one or more timing devices are depicted therein. As shown in FIG. 4, a timing device 410 comprises a first timing component 401 and a second timing component 403. In some embodiments, the first timing component 401 and the second timing component 403 comprise an electro-chemical timing device and comprise an anode and a cathode which have been deposited on a substrate, and a quantity of electrolyte, such as described above. As describe above, upon activation of the timing device 410, the anode is depleted longitudinally away from and perpendicular to the cathode. Depletion of the anode occurs at a point nearest to the cathode first and progresses longitudinally away from and perpendicular to the cathode.

The first timing component 401 is temperature independent and corrected for ambient temperature swings. In some of these embodiments, the first timing component 401 is configured to measure a period of 30 days. In these embodiments, the first timing component 401 measures a period of 30 days and is accurate independent of temperature. In some embodiments, the first timing component 401 comprises a means for activating the device.

The second timing component 403 is sensitive to temperature. For example, in some embodiments, the second timing component 403 is configured to measure the time in which the timing device 410 has been exposed to a certain temperature. In some embodiments, the second timing component 403 is configured to measure how long the timing device 410 has been exposed to a temperature of 140° F. As shown in FIG. 4, in some embodiments, the second timing component 403 is configured to indicate the total amount of time that the timing device 410 has been exposed to an extreme temperature in five minute intervals. In some embodiments, the second timing component 403 is configured with ten segments to measured the total amount of time that the timing device 410 has been exposed to an extreme temperature in five minute intervals. However, the second timing component 403 is able to be configured with any desired amount of time segments.

The second timing component 403 is activated when the timing device 410 is exposed to a certain temperature. For example, in some embodiments, an electrolyte is used which is solid at room temperature, having no active ions. In these embodiments, the electrolyte melts at a desired temperature and becomes liquid, with active ions. Once the electrolyte is liquid it comes into contact with the anode and the cathode and the second timing component 403 is activated. In some embodiments, each segment of the second timing component 403 remains dormant until the preceding segment has become fully depleted before becoming activatable. Additionally, the second timing component 403 is normally dormant and only becomes activatable when the first timing component 401 is activated. When the first timing component 401 is activated, the second timing component 403 becomes activatable and is able to measure the time in which the timing device 410 has been exposed to a certain temperature. As described above, when the timing device 410 is exposed to the desired temperature the second timing component 403 is activated.

In some embodiments, a visual change and/or a visual pattern is uncovered as the first timing component 401 and/or the second timing component 403 expire. In some embodiments, electronically readable information is uncovered as the first timing component 401 and/or the second timing component 403 expire. In some embodiments, the electronically readable information comprises a barcode and/or a two-dimensional barcode.

As further shown in FIG. 4, the timing devices 410, 410', and 410" and configured in a sequential or linear manner in order to collectively indicate a passage of time. Although 12 timing devices are shown in FIG. 4, any desired number of timing devices are able to be grouped together. Additionally, while timing devices 410, 410', and 410" are numbered for clarity, all the timing devices as shown in FIG. 4 operate similarly.

The timing devices 410' and 410" are similar to the timing device 410 as described above, and comprises a first timing component that is independent of external temperature and a second timing component, which is sensitive to the external temperature. The timing devices 410, 410', and 410" arranged together collectively show a plurality of first timing components grouped together as a horizontal timing component and one or more vertical timing components.

Within the plurality of timing devices, each subsequent first timing component is dormant until the preceding first timing component has become fully depleted and then becomes activated. Each second timing component is normally dormant and becomes activatable when its associated first timing component is activated. When each first timing component is activated, the second timing component becomes activatable and is able to measure the time in which the timing device has been exposed to a certain temperature, once the timing device is exposed to that temperature. In some embodiments, each first timing component is configured to measure a 30 day interval of time.

In some embodiments, the first timing component depletes at a standard rate and doesn't require any outside influence. The depletion rate naturally occurs due to the potential difference between the metals of the anode and the cathode. As described above, in some embodiments, the anode comprises Al and the cathode comprises Cu. The second timing component is configured to deplete at an increased rate in order to give a visual notification of an elapsed exposure to a certain temperature. In some embodiments, the second timing component is configured to give a visual notification of an elapsed five-minute exposure to a certain temperature.

In some embodiments, as each timing device depletes, multiple anode depletion patterns are uncovered. In some embodiments, the anode depletion patterns comprise electronically readable information which is uncovered as time progresses. In some embodiments, the electronically readable information is a two-dimensional barcode. FIG. 4 shows a triangular shaped type of two-dimensional barcode. However, any appropriately desired barcode, two-dimensional barcode and/or electronically readable information is able to be uncovered as each timing device expires. The form-factor for each timing component and/or the entire timing device and system is scalable to fit virtually any size and time period.

In further embodiments, as each timing device depletes, electronically readable information comprising radio-frequency-identification (RFID) information is uncovered. In these embodiments, the RFID antenna material lies under the undepleted anode material and is shielded by the anode material. In some embodiments, the anode material comprises AL, which is able to shield radio frequencies from the RFID antenna material. Consequently, the RFID antenna material remains passive until the anode material depletes enough to reveal the antenna. Once the RFID antenna material is uncovered it is able to transmit its information to an appropriate receiver.

In some embodiments, a rapid change upon the expiration of a timing device is desired. A rapid change upon expiration is a desirable quality because it creates a more noticeable change. Rapid change upon expiration has previously been achieved by removing the requirement of the electrons having to flow through an existing resistor thus limiting the current and providing a path for electrons to flow back to a common cathode with no limiting effect. An effective means to accelerate change even further is to include cathode material as an alloy within the area of the anode where it is desirable for depletion to occur more rapidly. For example, in some embodiments, Cu is included as an alloy within the area of the anode where it is desirable for depletion to occur more rapidly. In some embodiments, a thin film deposit of an alloy of 98% Al and 2% Cu id placed in an area where a rapid depletion is desired. In these areas the electrons vacating the Al atoms only need to travel to an adjacent Cu atom in order to complete the reaction and deplete the anode layer.

In further embodiments, a supplemental reservoir of electrolyte is placed in the area where a rapid depletion of the timing device is desired. Particularly, as long as the supplemental reservoir contacts the anode and not the cathode, the electrolyte will remain passive. Rapid depletion does not occur until an ion path is created when the supplemental reservoir comens into contact with the main body of the electrolyte or by an introduction to a common cathode.

Figure 5:
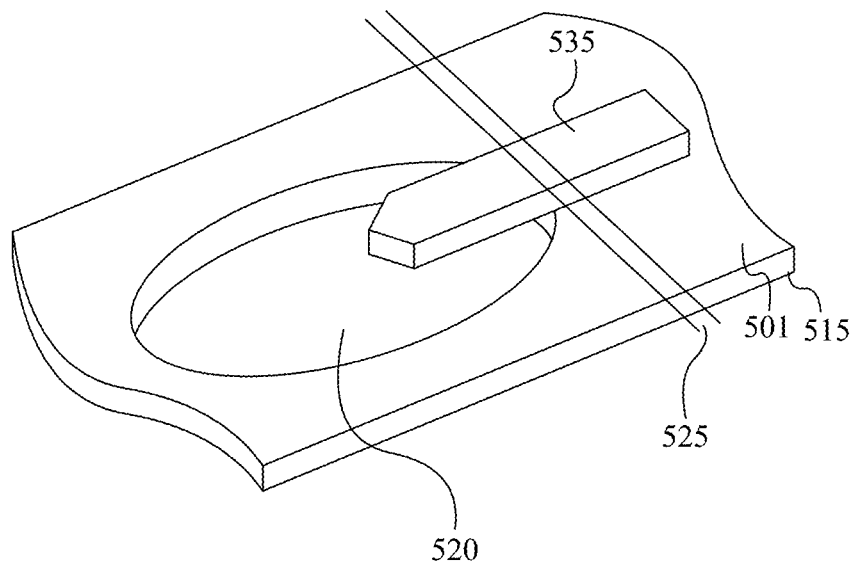
FIG. 5 illustrates an activation tab for a electro-chemical timing device in accordance with some embodiments.

Activation of the timing device occurs when a quantity of the electrolyte comes into contact with the anode and the cathode material. FIG. 5 shows an activation tab for a timing device, as described above, in accordance with some embodiments. The activation tab 500 is connected to a timing device, as described above and comprises anode material 501 and cathode material (not shown) deposited on a substrate 515, and a quantity of electrolyte 520. In some embodiments, the quantity of electrolyte 520 is isolated from the anode or cathode until activation is desired. When it is desirable to activate the timing device, the activation tab 500 is folded about the fold line 525 until the tab protrusion 530 becomes separated from where it is adhered to the cathode. Then, once separated, the electrolyte 520 is free to come into contact with both the anode material 501 and the cathode material simultaneously and activation is initiated. Upon activation, the anode layer 501 is depleted in order to indicate a passage of time, as described above.

In use, a timing device and system is able to be incorporated within and/or attached to an additional object in order to indicate whether a product is good or bad by exhibiting a visual change when a period of time has padded and/or when the product has been exposed to a temperature exceeding a desired limit. Data encoded within the timing device is visible to the human eye and encoded in electronically readable information, retrievable at a later date. Additionally, the timing device may be incorporated with paper and/or packaging and is able to survive brief periods of high humidity and vacuum. Further, the timing device is able to be manufactured with minimal cost and is able to passively or actively alert to extreme conditions and is accurate for three to 18 months and in the range of −20° C. to +60° C. Accordingly, the presently claimed invention as described herein has many advantages.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

I claim:

1. A timing device comprising:
    a. a first timing component for indicating a first time period; and
    b. a second timing component for indicating a second time period comprising a time that the timing device has been exposed to a predefined temperature during the first time period,
    wherein the second timing component is automatically activated upon reaching the predefined temperature during the first time period.

2. The timing device of claim 1, wherein each of the first timing component and
    the second timing component comprise an electrochemical timing device.

3. The timing device of claim 1, wherein the first timing component is temperature independent.

4. The timing device of claim 1, wherein the second timing component is sensitive to temperature.

5. The timing device of claim 1, wherein the second timing component is not activated until a certain temperature is reached.

6. The timing device of claim 1, wherein the second timing component undergoes a change in appearance when the predefined temperature is reached.

7. The timing device of claim 1, wherein the first timing component undergoes a change in appearance as the timing device expires.

8. The timing device of claim 1, wherein the timing device is electronically readable.

9. The timing device of claim 1, wherein the timing device is coupled to an additional object.

10. A timing system comprising:
   a. a plurality of timing devices, each timing device comprising:
      i. a first timing component for indicating an elapsed time period; and
      ii. a second temperature sensitive timing component comprising a plurality of segments, each segment configured to indicate a time period comprising a time that the timing system has been exposed to a predefined temperature.

11. The timing system of claim 10, wherein each timing device is depleted after activation in order to show a passage of time.

12. The timing system of claim 11, wherein the first timing component undergoes a change in appearance as one of the plurality of timing devices is depleted.

13. The timing system of claim 10, wherein the plurality of timing devices is arranged in a sequential pattern.

14. The timing system of claim 10, wherein each timing device remains dormant until a previous timing device is expired.

15. The timing system of claim 10, wherein each timing device is configured to measure a thirty-day time period.

16. The timing system of claim 10, wherein the first timing component and the second timing component are independently activated.

17. The timing system of claim 10, wherein the second timing component is configured to indicate exposure to a temperature in five minute intervals.

18. The timing system of claim 10, wherein the timing system is coupled to an additional object.

19. A method of making a timing device comprising:
   a. forming a first timing component for indicating a first time period on a first portion of a timing structure; and
   b. forming a second timing component on a second portion of the timing structure, the second timing component for indicating a second time period comprising a time that the timing device has been exposed to a predefined temperature during the first time period, wherein the second timing component is automatically activated upon reaching the predefined temperature during the first time period.

20. The method of claim 19, wherein the timing device comprises a two-dimensional barcode.

21. The method of claim 19, wherein the electronically readable information comprises a RFID antenna.

\* \* \* \* \*